Patented Oct. 30, 1923.

1,472,318

UNITED STATES PATENT OFFICE.

FREDERICK C. ATKINSON, OF INDIANAPOLIS, INDIANA.

CORNCOB CELLULOSE AND METHOD OF PREPARATION.

No Drawing.   Application filed May 3, 1919.  Serial No. 294,610.

*To all whom it may concern:*

Be it known that I, FREDERICK C. ATKINSON, a citizen of the United States, residing at Indianapolis, in the county of Marion and State of Indiana, have invented certain new and useful Improvements in Corncob Cellulose and Methods of Preparation, of which the following is a specification.

The object of my said invention is to produce a satisfactory cellulose from corn-cobs, and it consists in the method by which such object is accomplished and in the product which is the result of such method, all as will be hereinafter more fully described and claimed.

By the method which I have invented and by actual practise developed to produce the practical results called for, the corn-cobs are broken up mechanically or pulverized and boiled with very dilute mineral acids which extract the sugars and other such matters as may be soluble in acids. I then wash it to partially free it from the acid and to remove such soluble matter as we can remove with water. The residue from this treatment is again boiled with dilute caustic solution, preferably caustic soda and usually of a strength between 1 and 2%, that is, of a quantity sufficient to bring the alkalinity of the menstrum to a strength of 1% to 2% in terms of sodium oxide. This boiling treatment is continued from 30 minutes to 1½ hours, or until the gums are dissolved, after which the soda is removed; first, by means of centrifugal force; then the residual mass is mixed with hot water and again boiled to remove that part of the caustic soda that is tenaciously held by the cellulose. Two or three of such washings in hot water are sufficient to give a cellulose of a fair degree of purity, sufficiently pure for most purposes. In order to get it absolutely free of caustic I find it of advantage, after one or two washings to partially free it from caustic soda, follow this with a second acid wash, or acid bleach, to facilitate the removal of caustic and get a more thoroughly purified cellulose. The cellulose is usually of a brownish color and is suitable for many technical applications, such as a body for linoleum or for certain insulating materials, but in order to get a product of more general application in the industries and arts we prefer to bleach this with chlorine, or with a solution of hypochlorite of calcium, or the hypochlorite of some other alkali or alkali earth. The residual chlorine or chlorite has to be washed out by means of water and the cellulose dried, first by centrifugal force, or by pressure, and then by drying in a drier, such as is used in the industries. This gives the cellulose material in its most perfect form.

The first acid boil may be supplanted by aqueous boiling in an autoclave, or a very long continuel boiling at atmospheric pressure; but when only the cellulose is required from the corn-cobs the treatment is more easily carried out by an acid boil first, followed by washing and the soda boil, and a subsequent acid boil. If we dispense with the acid boil a more expensive equipment is required; namely, an autoclave or a more expensive operation is required, atmospheric boiling with water for a longer period.

Having thus fully described my said invention, what I claim as new and desire to secure by Letters Patent, is:

1. The process of producing cellulose from corn-cobs which consist in breaking up the cobs, boiling in dilute mineral acids, then washing to remove a portion of the acid and such soluable matter as can be removed with water, then boiling the residue in a dilute caustic solution, then removing the caustic, first by centrifugal force, then from the residual mass by mixing with hot water, again boiling to remove the caustic that is tenaciously held by the cellulose then repeating until the cellulose is substantially free, substantially as set forth.

2. The process of producing cellulose from corn-cobs which consists in breaking up the cobs, boiling in dilute mineral acids, then washing to remove a portion of the acid and such soluble matter as can be removed with water, then boiling the residue in a dilute caustic solution, then removing the caustic, first by centrifugal force, then from the residual mass by mixing with hot water, again boiling to remove the caustic that is tenaciously held by the cellulose then repeating until the cellulose is substantially free, then subjecting the residue to another acid wash or bleach to purify the same.

3. The process of producing cellulose from corn-cobs which consists in breaking up the cobs, boiling in dilute mineral acid, washing to remove a portion of the acid, boiling the residue in a dilute caustic solution, removing the caustic, bleaching the residue, and drying.

4. The process of producing cellulose from corn-cobs which consists in breaking up the cobs, boiling in dilute mineral acids, then washing to remove a portion of the acid and such soluble matter as can be removed with water, then boiling the residue in a dilute caustic solution, then removing the caustic, again boiling to remove the caustic that is tenaciously held by the cellulose then repeating until the cellulose is substantially free, substantially as set forth.

5. The process of producing cellulose from corn-cobs which consists in boiling them with dilute mineral acid, washing to remove a portion of the acid, boiling the residue in a dilute caustic solution and removing the caustic.

In witness whereof, I have hereunto set my hand and seal at Indianapolis, Indiana, this 23rd day of April, A. D. nineteen hundred and nineteen.

FREDERICK C. ATKINSON. [L. S.]

Witnesses:
 E. W. BRADFORD,
 M. L. SHULER.